Patented Aug. 14, 1945

2,382,764

UNITED STATES PATENT OFFICE 2,382,764

RECOVERY OF POLY-GLYCEROL RESIN

Harland H. Young, Chesley S. Young, and Purdy Bradford, Chicago, Ill., assignors to Industrial Patents Corporation, Chicago, Ill., a corporation of Delaware No Drawing. Application December 16, 1942, Serial No. 469,216

2 Claims. (Cl. 260—615)

The present invention relates to recovery processes and to products produced thereby. More particularly, it relates to processes for recovering poly-glycerol resins from the residues of glycerol stills and to the resin product so produced.

In the commercial manufacture of glycerol it is necessary to carry out a number of distillations in order to yield a product which is free from odor, color, reducing bodies and other impurities. Glycerol is a high boiling, polyhydric alcohol and because of the relatively high temperatures encountered in the stills it undergoes intermolecular dehydration and polymerization. The polymerization produces a sizeable quantity of relatively non-volatile poly-glycerol resin within the stills which is molten at the high still temperatures but solidifies to a vitreous mass when cooled. This vitreous resin does not occur in a pure state but exists along with salts, soap, tar, carbon and other impurities which result from the previous soap processing steps to which the glycerin was subjected or from the thermal decomposition of the glycerin during distillation. This resin and impurity mixture is commonly known as "glycerin foots" and at room temperatures is a vitreous solid which is very hard to grind and which is not rapidly dissolved in water even after grinding.

It has been found that the glycerin foots can be processed so as to remove the poly-glycerol resin and produce an excellent plasticizer for glues, adhesives and other products which are now plasticized so as to enable them to be flexible and pliable by the use of glycerol, diethylene glycol and other relatively expensive hygroscopic materials.

It is an object of the present invention to provide a process of recovering poly-glycerol resin from residues of glycerol purification stills.

It is another object of the present invention to provide a process of producing poly-glycerol resins.

It is a further object of the present invention to provide a poly-glycerol resin.

It is a still further object of the present invention to provide a poly-glycerol resin capable of use as a plasticizer.

Other objects and advantages of the invention will in part be obvious and will in part appear hereinafter.

The invention accordingly comprises the several steps and the relation of one or more of such steps with respect to each of the others, and the product possessing the features, properties, and the relation of elements, which are exemplified in the following detailed disclosure, and the scope of the invention will be indicated in the claims.

The process of the present invention in general comprises injecting steam into the molten residue remaining in a glycerol still following glycerol distillation operations to cool and dissolve the residue, draining the aqueous solution from the still, precipitating out the impurities, treating the remaining aqueous solution with heat to crystallize out the soluble salts which carry out the poly-glycerol resin, dissolving the poly-glycerol resin from the residual salt cake and volatilizing the solvents so as to free the poly-glycerol resins.

The process of the present invention enables valuable plasticizers to be produced from what has heretofore been regarded as practically a waste product, and produces a plasticizer which can be used in place of material such as glycerin which is frequently in demand and is either not obtainable or is too expensive to use in large quantities as a plasticizer. This is particularly true during periods of war.

In the preferred form of the process of the present invention, steam is injected into the molten glycerin foots in the bottom of a glycerol still following a glycerol distillation operation. The steam serves to cool and dissolve the residue so as to form a solution containing, for example, about 50 to 80 per cent solids. This solution is drained from the still and diluted with water to form a solution having a solids content which is preferably of about 5 to 20 per cent.

This aqueous solution is then treated with any suitable soap precipitant which yields calcium, barium or heavy metal ions which will precipitate the soap present in the solution. Other impurities such as the charred black pigment present in the residues will also be precipitated along with the soap. The soap precipitant used may be, for example, soluble salts of calcium, barium, iron, lead, copper, etc., and is added to the aqueous residue solution while the latter is contained in any suitable tank or settling basin which will accommodate the precipitate and permit the remaining liquid to be withdrawn without disturbing the precipitate.

The upper aqueous solution is withdrawn from over the precipitate and will be found to contain soluble salts and poly-glycerol resin. This solution is heated to evaporate water and crystallize out the salts which carry the poly-glycerol resin with them.

The poly-glycerol resin and the salts are treated with a volatile solvent for the poly-glycerol resin, for example, the volatile fatty alcohols, such as isobutyl alcohol, isopropyl alcohol; mono ethers of glycols; the low boiling glycols, such as ethylene and propylene glycols and their mono alkyl ethers; adehydes, such, for example, as furfural, and ketones such as acetone and methyl ethyl ketone. Any other solvents which dissolve the poly-glycerols and precipitate the inorganic salts may also be used.

The volatile solvent containing the dissolved poly-glycerol resins is then heated in a suitable vessel to evaporate the solvents, which may be recovered by the use of any well-known type of recovery system, to free the poly-glycerol resins. These resins after being freed from the solvents occur as viscous liquids or semi-solids and are highly hygroscopic in nature.

In the event poly-glycerol resins which are entirely free from color and all solid materials are desired, it is to be understood that any desired bleaching and/or filtration steps may be employed at any appropriate point in the process. For example, an advantageous point in the process to bleach and filter the product is just before the volatile solvents are evaporated to release the dissolved resins, since the resin is substantially purified at this point and is in condition for bleaching.

The poly-glycerol resin produced as previously described may be used in the liquid or semi-solid state as a plasticizer or may be modified by the addition of other known plasticizers, such as soft resins of the alkyd type, glycerin, glycols, or plasticizers of the organic ester type such as tricresyl phosphate and di-butyl phthalate, to produce a plasticizer mixture having substantially any desired consistency and preferred plasticizing properties. The plasticizers of this invention may be used for glues, adhesives, coating compositions, other resins, plastic sheets, foils, films and molding compositions. The diversity of consistencies of the resinous products of this invention enables these products to be used over a wide range of operations where hygroscopic plasticizers are desired.

These resinous products have particular utility where a crystal-clear, liquid plasticizer is required. For example, they are universally satisfactory as a plasticizer for transparent materials such as sheets, foils or tubes formed of plastic materials such as cellulose or cellulose derivatives, such as cellulose hydrate regenerated from viscose solutions, precipitated from cuprammonium solutions of cellulose, or formed by de-esterifying cellulose esters. The plasticizer may be applied to these materials at any desired time, for example, just prior to drying during their original formation by passing the material to be plasticized through a bath comprising an aqueous solution of the resin of the present invention, scraping off the surplus from the surface of the material and drying the material. The drying step does not affect the plasticizer and the dried materials are pliable, free from tackiness, odor and taste, transparent, non-toxic, and do not become brittle upon aging due to chemical changes within the plasticizer.

By way of explanation and not in limitation of the invention, the following examples of uses of the resins of the invention will be given:

*Example I*

30 parts by weight of animal glue, for example, hide glue, is mixed with 40 parts by weight of water while being heated at a temperature which will substantially soften the glue, for example, 60° to 95° C. 30 parts by weight of the polyglycerol resin of the present invention is added to the diluted glue, preferably while it is still being heated, accompanied by vigorous agitation until the plasticizer mixture is well dispersed throughout the water-glue mixture. The product is then permitted to cool and the flexible glue product so formed can be used immediately or stored for an indefinite length of time and then used without losing its characteristics of flexibility and adhesive strength.

*Example II*

A web of newly formed cellulose hydrate, such as is commonly termed Cellophane, is passed from the last bath in the manufacturing process into a bath comprising 5 per cent to 20 per cent poly-glycerol resin and 95 per cent to 80 per cent water at room temperature. The web is festooned over suitable rollers, the lower rollers of which are disposed near the bottom of the tank, so as to maintain the web in contact with the plasticizing solution for sufficient time to permit the solution to thoroughly impregnate the web. As the plasticized web leaves the tank, the surface liquid is squeegeed off by any suitable scraper or roller and returned to the plasticizing bath. The web of plasticized cellulose hydrate is then passed through suitable driers to reduce the moisture content. The plasticizer content within the web may be varied as desired, for example, 8 per cent to 18 per cent plasticizer is a preferred range. The plasticized cellulose sheet so formed will retain its pliability at low temperatures and will not become unduly soft and tacky at elevated temperatures and when exposed to excessive humidity.

Although the two examples given above both disclose the use of poly-glycerol resin of the present invention when in liquid form, it is to be understood that the resin is equally capable of use while in plastic or semi-solid form where a more viscous plasticizer is desired.

Since certain changes in carrying out the above process, and certain modifications of the composition which embody the invention may be made without departing from its scope, it is intended that all matter contained in the above description shall be interpreted as illustrative and not in a limiting sense.

The invention having been described, what is claimed is:

1. The process of producing poly-glycerol resin which comprises injecting steam into the molten residue of a glycerine still following a glycerine purification distillation operation to cool and dissolve the residue, precipitating impurities from the resulting aqueous solution by the addition of water soluble salts which form insoluble compounds upon reacting with the impurities, separating said precipitates, concentrating the remaining liquid by evaporating the water from the water soluble salts and the poly-glycerol resin, selectively dissolving the poly-glycerol resin from the water soluble salts, and recovering the poly-glycerol resin from the solvent.

2. The process of producing poly-glycerol resin which comprises injecting steam into the molten residue of a glycerine still following a glycerine purification distillation operation to cool and dissolve the residue, precipitating water soluble soap impurities from the resulting aqueous solution by adding a water soluble salt of a heavy metal to form a water insoluble soap precipitate, separating said insoluble soap precipitate, concentrating the remaining liquid by evaporating the water from the water soluble salt and the poly-glycerol resin, selectively dissolving the poly-glycerol resin from the salt, and recovering the poly-glycerol resin from said solvent.

HARLAND H. YOUNG.
CHESLEY S. YOUNG.
PURDY BRADFORD.